Patented Mar. 9, 1937

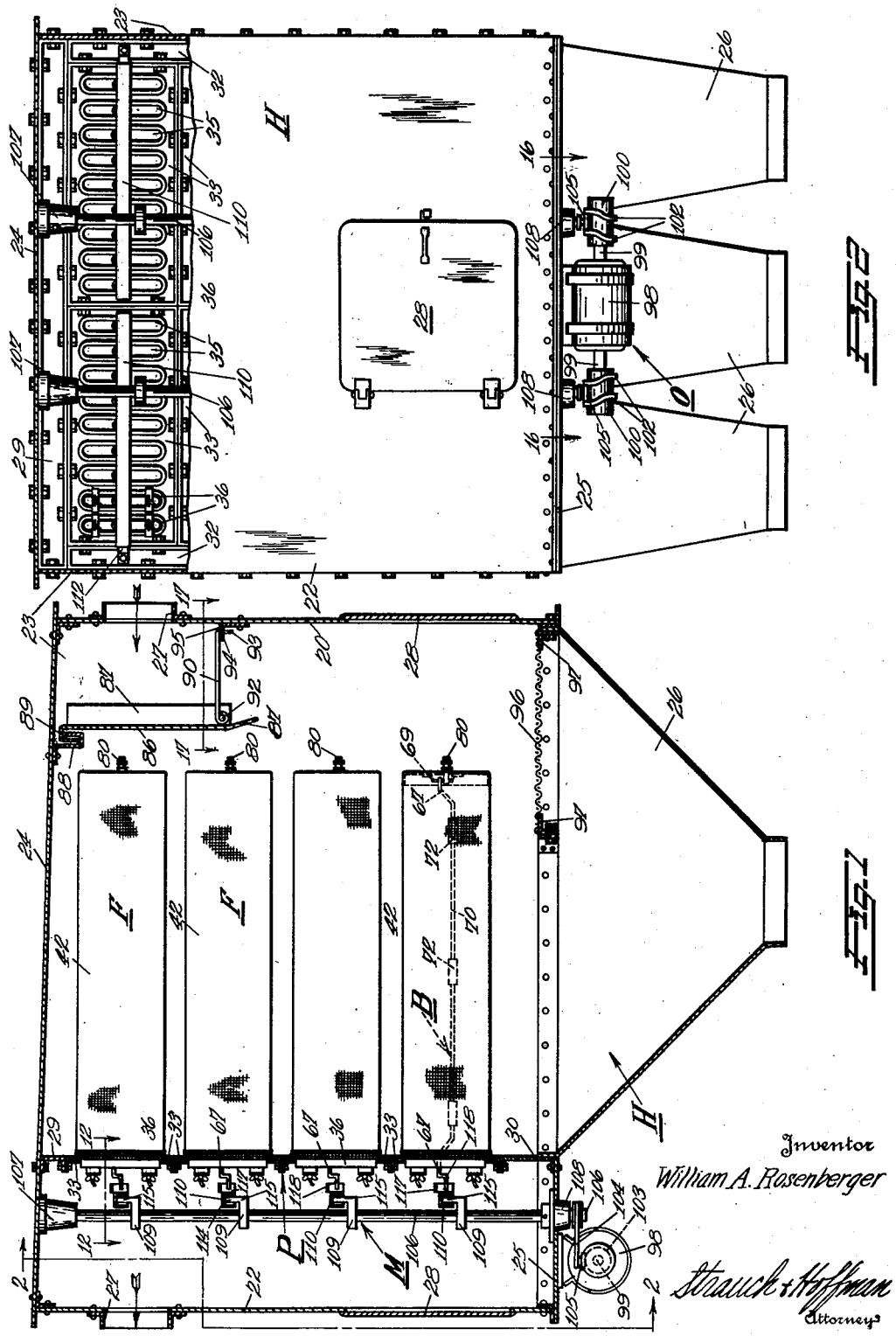

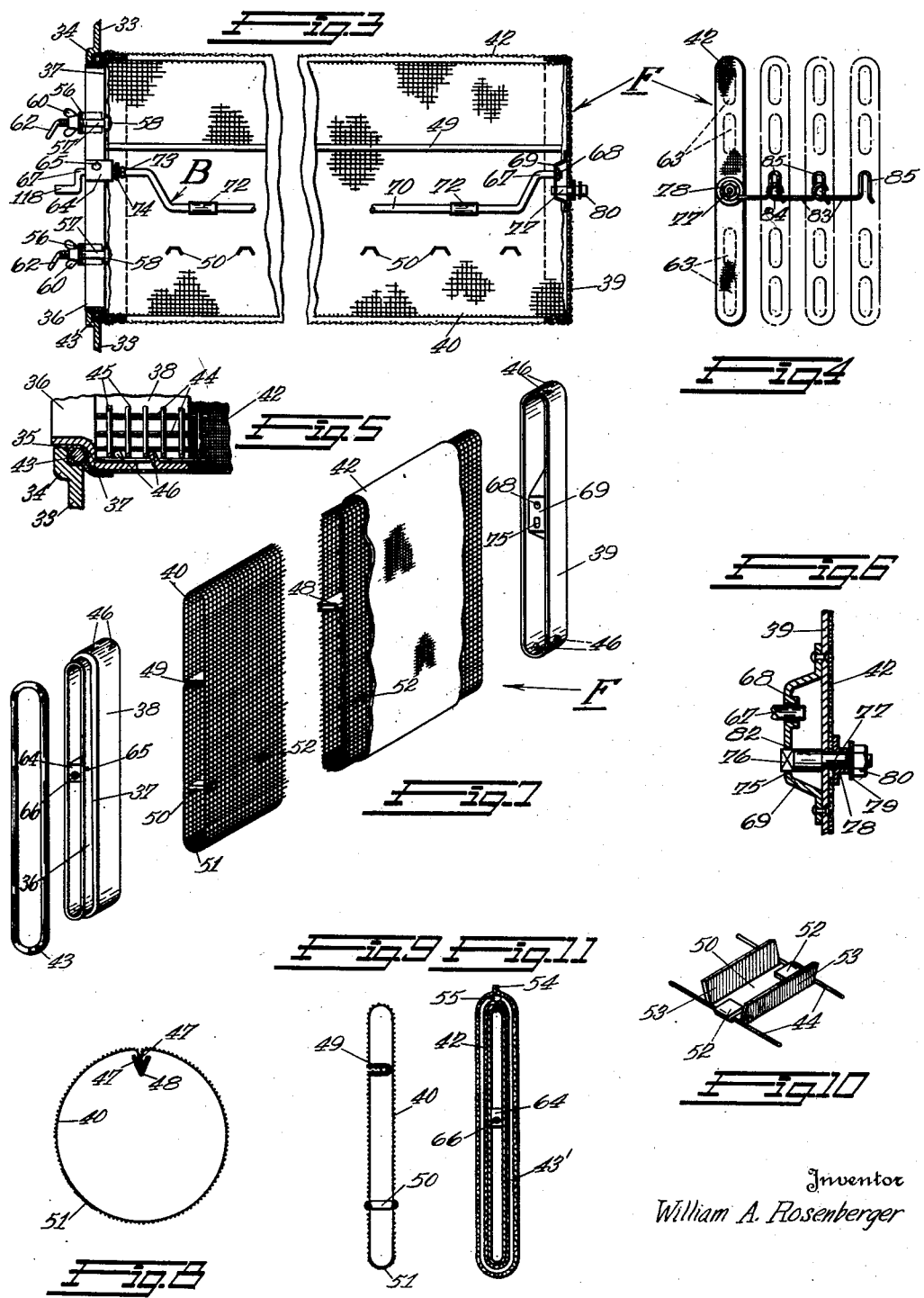

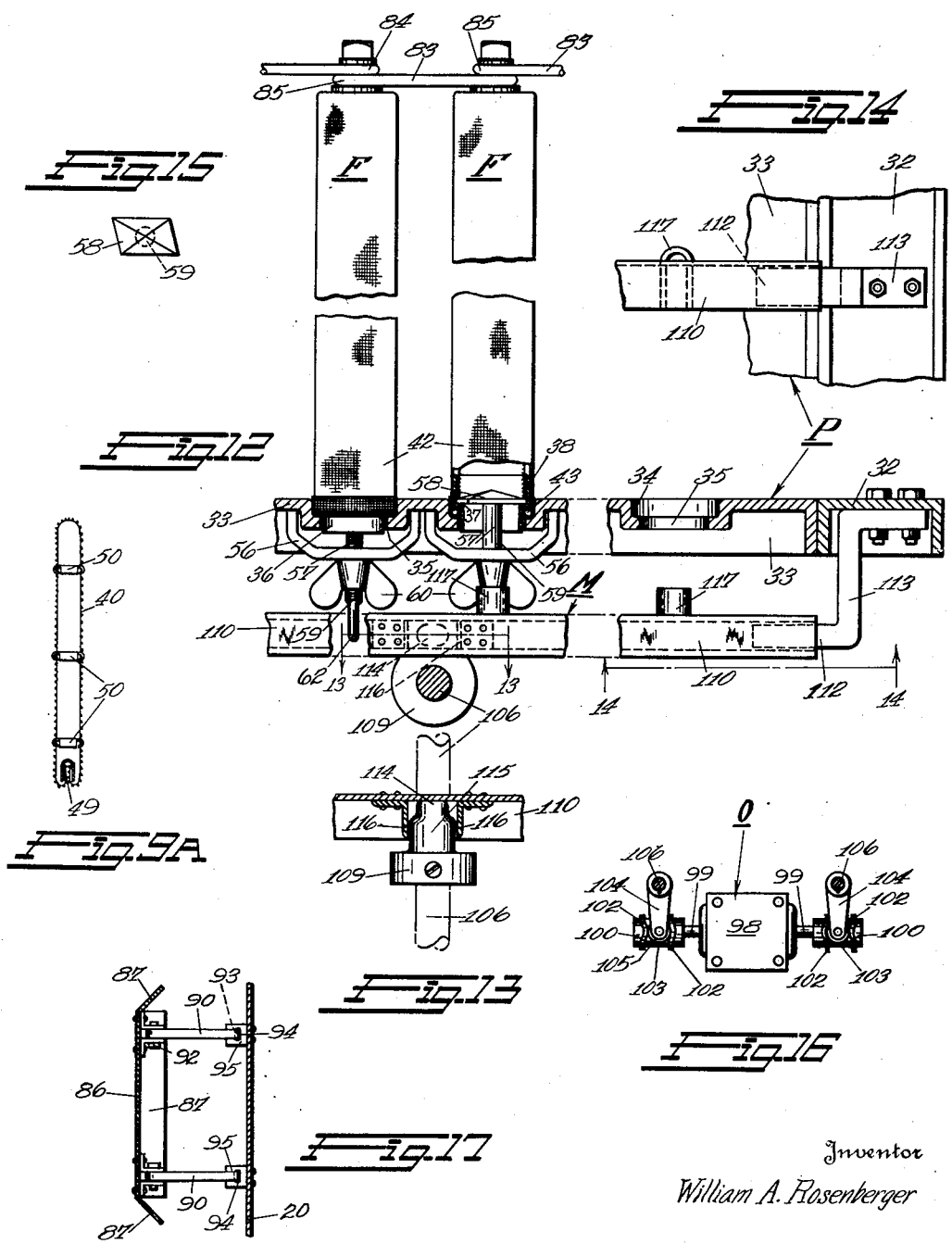

2,072,906

UNITED STATES PATENT OFFICE 2,072,906

FILTERING AND COLLECTING APPARATUS

William A. Rosenberger, Hagerstown, Md., assignor to Pangborn Corporation, Hagerstown, Md., a corporation of Maryland Application August 11, 1933, Serial No. 684,738

24 Claims. (Cl. 183—59)

This invention relates to filtering and collecting apparatus, especially that of the type designed to remove dust or the like from a current of air or other gaseous fluid. Such apparatus ordinarily is designed for industrial use to cleanse a stream of air or to recover dust and similar particles from a fluid.

More specifically, the present invention relates to dust collectors which are provided with a plurality of filtering units for removing dust from a dust-laden gaseous stream, and which are provided with means for vibrating the filtering units to free the arrested dust.

In the prior art it has been conventional to mount the filtering or screening units with their filter cloth or canvas stretched under appreciable tension. Such method of mounting decreases the life of the cloth, makes assembling and disassembling operations more difficult, and either adds to the internal space requirements of the apparatus or makes it inconvenient for the repairman to work within the apparatus.

It is a major object of the present invention to eliminate all accessory or secondary mountings for the filter units, thus permitting their cloth covers to be assembled without excessive stretching, and eliminating the disadvantages enumerated above. The word "cloth" is used here and hereinafter to refer to any type or suitable kind of filtering material, regardless of whether it is fabricated from textile products or from metallic or other types of non-metallic materials, and the word "cover" is intended to define any envelope, bag or the like formed from such cloth.

It is a primary object of this invention to provide, in a filtering unit, a wire screen or similar foundation form for telescoping cooperation with the filter cloth. A metallic grillwork or screen foundation will not interfere with the fluid flow and will prevent the cloth from collapsing under even very high pressure differentials. When a fluid current is passed through the cloth to press the latter into engagement with a metallic grillwork such as wire screen, there seems to be a constant light trembling or vibration of the cloth under pressure which prevents the dust particles from packing and closing the pores of the cloth and thus permits more efficient and longer use of the cloth between beating operations.

The superiority of the combination of a wire grillwork in surface engagement with a filtering cloth is even more pronounced during the periodical dust collecting or beating operations, particularly when the beaters act directly against the grillwork, because the entire grillwork can be set into vibration by striking it at only one or relatively few points, with the result that the numerous individual elements of the grillwork vibrate against the cloth at a multiplicity of points and thus thoroughly beat and clean the cloth.

It has been standard practice in the past to utilize beaters which are disposed on the dust-laden air side of the filtering units, so that the beaters operate against the dirty surfaces of the filter cloth with some tendency to drive the dust into the cloth while loosening the bulk of it for discharge by gravity into dust collecting chambers or receptacles. It is a major object of the present invention to so design and relate a filter unit and a beater that the latter works against the clean surfaces of the cloth to maintain the pores of the cloth open and thus increase the efficiency of the apparatus, between beating intervals, by permitting a lower pressure differential to be effectively maintained on the opposite sides of the cloth.

It has also been conventional, heretofore, to dispose some or all of the moving parts of the beating mechanism on the dust-laden air side of the apparatus. Such arrangement is open to the objections that the moving parts are apt to cause sparks and dust explosions, and that accumulations of dust on the parts causes excessive friction and rapid wear. It is another important object of the present invention to assemble all movable parts on the clean air side of the apparatus and thus avoid such disadvantages.

It is a further major object of this invention to provide banks or sets of small, easily handled filter units that are individually removable and replaceable without the use of tools and without the dismantling of any part of the collector housing or framework. In this connection, it is also an object to so design the supporting structure, in sections, that each bank or set of filter units may be inserted and removed as a unit. This construction preferably is carried out with duplication of parts to permit the size or capacity of the collecting apparatus to be readily varied either with or without increasing the floor space.

Another object of the present invention is to devise a collecting apparatus of all metal construction, except for the filter cloths which preferably are non-metallic, thereby avoiding warping of parts and automatically grounding the filter units to eliminate the fire hazard which would otherwise be present from static electricity.

It is a further object of my invention to devise filter bags or covers that can be added to or removed from their supporting foundations in a few seconds. The latter, preferably of steel, may be used over and over, the only normal upkeep expense being the cost of new bags from time to time.

Still another object of the present invention resides in the provision of a complete filtering and collecting apparatus which can be assembled and worked on by unskilled employees with assurance that an absolutely dust-proof seal will be provided, between the opposed clean and dust-laden air sides of the apparatus and at all other points. A special feature of my illustrated design is that all work may be performed within the collector housing, without even partially disassembling the latter.

A further important object of this invention is to provide new and improved beating mechanism; and in this connection it is a particular object to utilize a single source of power for beating purposes in such manner that several sets of beaters may be actuated without throwing an unbalanced load or thrust upon the apparatus providing the power source.

The foregoing and further objects, particularly such as reside in numerous important structural details throughout the assembled apparatus, will fully appear from a study of the following detailed description when taken in conjunction with the accompany drawings.

In the drawings, which represent a preferred embodiment but which are mainly illustrative of the principal invention and its sub-combinations:

Figure 1 represents a vertical section taken approximately centrally of the entire filtering and collecting apparatus of the present invention.

Figure 2 is an elevational view, partially in section, as seen when looking toward the clean air side of the apparatus substantially upon the planes of the irregular line 2—2 in Figure 1.

Figure 3 is an enlarged view, in vertical central section, of one of the filtering units and its associated beater element.

Figure 4 is an elevational view of the unsupported end of the filter unit of Figure 3, with a showing of its relation to several similar filter units.

Figure 5 is an enlargement of the detail seen in the lower left hand corner of Figure 3.

Figure 6 is an enlarged detailed section taken vertically through the bearing and fastening assembly seen at the right end of Figure 3.

Figure 7 is an exploded view of the filter unit, in perspective and with part of the filter cloth cover and its beater removed for clarity.

Figure 8, designed to show one of the steps in the preferred method of forming the wire screen of the filter unit, is a view taken in cross section through a cylindrical piece of screen.

Figure 9 represents a vertical section through the screen of Figure 8 after the latter has been shaped and reenforced.

Figure 9A is a view similar to Figure 9 but taken through a modified form.

Figure 10 is a perspective view illustrating the application of one of the reenforcing means of Figure 9.

Figure 11 is a cross-sectional view taken adjacent the cloth retainer on the supported end of one of the filter units, so constructed as to embody a cloth cover that has a longitudinal seam. The parts seen in this view are slightly out of proper relative proportion for clarity of illustration.

Figure 12 is an enlarged fragmentary sectional view taken on the plane of the line 12—12 in Figure 1, and designed primarily to illustrate the beater mechanism.

Figure 13 is a detailed section taken on the plane of line 13—13 of Figure 12.

Figure 14 is a fragmentary elevation as seen when looking upon the plane of line 14—14 in Figure 12.

Figure 15 is a plan view of the head of one of the clamping elements seen in Figure 12 and several of the other views.

Figure 16 is a horizontal section taken on the plane of line 16—16 in Figure 2 to disclose the power source for the beater mechanism.

Figure 17 is a horizontal section as seen on the plane of line 17—17, Figure 1, showing some of the details of a readily removable baffle plate.

With continued reference to the drawings, wherein like characters are employed to designate like parts:

The illustrated apparatus comprises, as its major parts, a housing H divided by a partition P into dust laden and clean air chambers or sides, with filter units F mounted on the partition and located in the dust laden air chamber, beaters B carried by the filter units, beater actuating mechanism M disposed in the clean air chamber, and operating means O for the beater mechanism.

The housing H consists of side walls 20 and 22 interconnected by end walls 23, a roof 24 which preferably is given a slight slope in one direction, and a partial floor 25 into which are fitted several dust collecting and discharging hoppers 26. The lower ends of the latter will be normally closed by any suitable or conventional means (not shown) which can be manually or automatically opened at intervals to release the accumulated dust.

The wall 20 has an inlet connection 27 for dust-laden air or other gas to be filtered, and the wall 22 has a similar connection for the withdrawal of the filtered air. These walls also have doors 28 permitting workmen to enter the housing from either side of the partition P and to insert or remove any of the internal parts of the apparatus. The joints between all of the housing parts thus far described are of course sealed so that a pressure differential, preferably brought about by connecting the intake side of a pump to the discharge outlet 27, can be efficiently established.

The partition P comprises a rectangular frame, formed by a pair of horizontal flanged members 29 and 30 and a pair of vertical flanged members 32, and a plurality of rectangular supporting plates 33 vertically arranged in tiers to fill said frame. Each of these plates 33 is designed to support a plurality of horizontally spaced filter units, and all of the plates are of identical construction so that each will properly receive any one or more of a group of standard interchangeable filter units and so that the plates themselves are interchangeable. The margins of the plates are flanged as shown, with the flanges cooperating with those of other plates and with the flanges of the surrounding framework to form seals that can be made with detachable bolts or any other suitable fastening means. This plate construction and arrangement permits the building of the apparatus to any desired size of capacity from standard parts; and further permits, subject to modification or replacement of the side walls and a few other parts, any apparatus that is already in operation to have its filtering capacity varied without changing the required floor space for the apparatus and without discarding or replacing any of the major parts of the original apparatus.

The plates 33 may be cast accurately to shape, or may be formed by a pressing or stamping operation. Each has a plurality of horizontally spaced, vertically elongated oblong recess or shoulder formations 34 (Figures 3, 5, and 12) which surround a set of oblong ports 35 extending through the plates. The ports 35 are for the purpose of passing filtered air to the clean air side of the partition and of assisting in the support of the filter units; and to these ends the filter units F have discharge nozzles 36 (see Figures 5 and 7) designed to fit into the ports having surrounding shoulders 37 for complemental cooperation with the shoulder formations 34 of the plates in a manner later set forth.

Each nozzle 36 is an integral extension, reduced by virtue of the shoulder 37, of an oblong metal sleeve 38. In addition to the sleeve 38, each filter unit F comprises a metal end cap 39; a metal grillwork or screen 40 shaped to have its open ends snugly fit within the sleeve 38 and the cap 39; a cloth cover in the form of a bag 42 designed to encase the end cap and screen and to have its open end overlap the nozzle 36; and an oblong clip 43 designed to hold the overlapt end of the bag against the outer surface of the nozzle shoulder 37. The overlapt bag material preferably is turned back on the clip 43 and used to provide a gasket between the sleeve 38 and the plate shoulder 34. Firm engagement at this joint, and support for the entire filtering unit, is afforded by detachable clamping means, later to be described.

Although various alternatives may be used, the grill-work 40 preferably is made from a relatively strong metal screen of the type having its mesh formed from a plurality of longitudinal wires 44 and a plurality of transverse wires 45 secured together at their points of intersection (see Figure 5). A woven screen is also quite satisfactory. The ends of the screen sleeve may be soldered or otherwise fastened within the ends of caps 38 and 39, and to reenforce these joints the top and bottom of each end cap preferably has a pair of prongs 46 struck inwardly so that their points project toward the extreme ends of the corresponding caps. As best seen in Figure 5, each pair of prong points is designed to snap inwardly behind a pair of the transverse screen wires 45 and thus assist in locking the screen sleeve with respect to the end caps. Solder preferably is added at these points of interlocking engagement and very strong joints are thus obtained. This feature is of particular importance when applied to the upper end of the anchored end cap 38 where the screen has its greatest tendency to pull away because of the weight of the filter unit. The solder at this particular point will be placed effectively in compression between the screen and the prongs instead of in shear or tension.

One preferred method of forming the screen sleeve is illustrated in Figures 8 and 9. A rectangular sheet of screen is rolled into cylindrical form, as in Figure 8, with its meeting edges bent inwardly to form a pair of mating flanges 47. A light V-shaped channel member 48 is then fitted over the engaged flanges and thereafter flattened and soldered against the latter to form a longitudinal reenforcing strip 49 (Figure 9).

The cylinder is then flattened to give it a final oblong cross-sectional shape as in Figure 9, with the strip 49 disposed intermediate the top and bottom edges of the sleeve. When the filter unit is in operation this reenforcing strip helps to maintain the side walls of the unit in properly spaced relation under the differential pressures developed, and also lends longitudinal rigidity for resisting bending stresses induced in the unit under the action of gravity.

Further spacers may be added in the form of light metallic members 50 when the screen is of relatively light weight or when the vertical dimension of the filter unit is rather large. In such event, the strip 49 will be so disposed, and the members 50 so aranged in a line longitudinally of the screen, that they divide the latter vertically into three substantially equal parts. The body of each member 50 is of a length equal to the spacing between the side walls of the screen sleeve, and has end tabs 52 designed to be projected outwardly through the screen mesh and then bent around a pair of the longitudinal screen wires 44 that are contained in the opposed side walls of the screen sleeve, as illustrated in Figure 10. Each member 50 also has a pair of angularly disposed leaves 53 the ends of which are adapted to abut an appreciable area of the side wall mesh.

As the bottom edge of the screen sleeve is under appreciable compressive stress, its rigidity or resistance to bending and buckling preferably will be increased by some suitable expedient. As illustrated in Figures 7 and 9, this can be accomplished by so forming and shaping the screen that the longitudinal wires of the sleeve will be much more closely spaced at 51, at the bottom of the sleeve, than in the top and side walls.

A preferred arrangement, however, is disclosed in Figure 9A, wherein the screen sleeve is so shaped that the longitudinal reenforcing strip 49, formed at the meeting edges of the sheet of screen, will be disposed at the bottom of the sleeve in a vertical plane. When this construction is utilized it will ordinarily be necessary to employ several horizontal spacing means, such as for example, three longitudinal rows of the spacing members 50, as illustrated.

It will be appreciated that the above disclosed reenforcing and spacing features merely constitute preferred examples.

Each filtering cover 42 might be arranged in the form of a sleeve fitted between the end caps 38 and 39, but preferably is constructed in the form of a bag enclosing the foundation structure and with its sleeve portion accurately but rather loosely conforming to the shape of the screen and substantially in surface contact with the latter. The bag is not under tension—at least under no such appreciable tension as would operate to shorten its life. The material of the cover consists of any suitable filtering cloth, such as tubular knit fabric or cross woven textiles.

In some instances where the bag is not knitted tubularly but is formed by securing two edges of a sheet of material together, a seam will be formed longitudinally of the bag. In such a construction if the seam is disposed internally, a thick portion 54 will appear when the open end of the bag is turned outwardly and back upon itself (see Figure 11) which, unless specially provided for, will cause the gasket between the retainer 43 on the anchored end cap or band 38, and the corresponding partition section 33, to be of uneven thickness and non-uniform sealing capacity.

To counteract such an undesirable effect, the bag is mounted with the seam disposed at either the top or bottom of the filter unit, and the retainer is modified to form a clip 43' having a short gap 55 at one end to receive a part of the thick portion 54 when the filter unit is clamped against the partition. In case the bag is formed with the longitudinal seam externally disposed, the clip 43' is equally satisfactory, as its gap 55 will directly receive a portion of the seam.

The sole anchoring or supporting means for the filter units comprises, in addition to the recessed partition section 33, a plurality of quick-clamping assemblies for cooperation with the latter. Each clamping assembly (see especially Figure 12) comprises a roughly U-shaped bridge member 56 disposed on the clean air side of the partition and having its legs in engagement with the partition on opposite sides of a port 35, a specially designed bolt 57 having a head 58 engaging the filter nozzle shoulder 37 and having a threaded shank 59 projecting through the port 35 and thence freely through the bridge member, and a wing nut 60 screwed onto the free end of the shank. The head 58 is of such rectangular marginal shape that it may be freely inserted, when the bolt is properly positioned, through the mouth of nozzle 36, and thereafter turned until its short edges overlap the nozzle shoulder 37 sufficiently to prevent withdrawal of the head through the nozzle.

To facilitate turning of the bolt, and for the purpose of holding the bolt head in proper position when the wing nut is tightened, the bolt shank has a smooth bent tip 62. The bend preferably is made in predetermined relationship with the head so that it can always be determined, by visible inspection of the bent tip, whether or not the head is properly engaged with the nozzle shoulder. It is preferred to use several clamping assemblies for each filter unit.

As should be obvious from the foregoing description, dust laden air will be drawn toward the outside surfaces of the banks of filter units and the filter bags 42 will prevent passage of the dust while permitting cleaned air to pass through the screens and thence through the partition wall by way of the nozzles 36. Some air is filtered through the free projecting end of each filter unit due to the provision in the end caps 39 of openings 63 (Figure 4) which not only increase the filtering capacity but also serve to lighten the unanchored ends of the filter units.

The end caps 38 and 39 are relatively light in construction, being preferably formed from pressed metal, but the former must have sufficient strength to effectively anchor one end of the unit, and both caps must be sufficiently rigid to provide bearings for the shaking or beating device B. One of the bearings comprises a two-part wooden block 64 fitted within the nozzle 36 between the ends of the latter and secured together and to the nozzle by a pin 65. The mating faces of the block form a hole 66 for receiving one end of a beater shaft 67. The other end of the beater shaft is journalled in a bearing 68 formed in a light bracket 69 which is secured to the inner face of the end cap 39.

The beater shaft has an offset eccentric arm 70 extending substantially throughout the length of the screen sleeve, and this arm is equipped with several sleeves 72 of rubber or the like which are adapted, upon oscillation of the shaft in a manner later set forth, to impinge alternately against the opposed side walls of the screen. The sleeves are designed to reduce wear and to eliminate metal to metal scraping action which might produce sparks. This beating action at a few spaced points is sufficient in connection with the filter units disclosed because substantially the entire screen will be set into vibration when it is struck, and this vibration will be completely and effectively transmitted to the entire filtering area of the cloth. A shaking operation of about one minute duration is sufficient to cause a thorough discharge of large accumulations of dust into the hoppers 26.

The beater shaft 67 has a bulge 73 (Figure 3) cooperating with a thrust washer 74 and the bearing 64 to prevent longitudinal displacement of the shaft.

Each bracket 69 (Figures 6 and 7) has an opening 75 designed to receive and non-rotatably hold the flat-sided end 76 of a special bolt 77 which projects out through the end cap 39 and its covering to receive a bushing 78, a washer 79, and a nut 80. The bolt body is enlarged at 82 to form a shoulder so that the nut may be tightened to press and seal the apertured portion of the cloth against the relatively thin material of the end cap without deforming the latter.

The special illustrated shape of the bushing 78 is imparted thereto to provide an annular space for reception of the ends of wire clips 83 (Figures 4 and 12). These clips are designed to ensure proper horizontal spacing of the rear projecting ends of the filter units and, by interconnecting said ends, to increase the efficiency of the beating and shaking mechanism. Each clip has a loop 84 forming a pivotal eye at one end for encircling one of the bushings 78, and a hook 85 at its opposite end in such position that the hook can be easily clipped downwardly upon one of the other bushings. Each clip forms an assembled part of a filter unit and can be readily connected and disconnected manually to an adjoining filter unit. All operations in the mounting and replacement of the filter units therefore are performable manually, with convenience and without the use of any tools.

Due to the individual and collective shapes of the filter units and their arrangement, the total effective filtering area or capacity of the sets of units is extraordinarily great, when compared with the volumetric space required for reception of the assembled units, and with the floor space required for the apparatus. A baffle member is customarily provided adjacent the inlet connection of the apparatus, and in the present invention this feature is so designed, for disposition relatively close to the plane of the rear ends of the filter units without interfering with ready replacement of the latter, that it does not detract from the compactness of the apparatus.

With reference to Figures 1 and 17, the baffle or fluid distributing construction comprises a vertical plate 86 having angularly disposed side and bottom deflecting flanges 87; a horizontal transversely disposed channel member 88 secured to the roof and designed to freely receive a vertical lip 89 turned downwardly from the upper edge of the plate 86; and a pair of positioning hooks 90 each pivoted at 92 to the bottom of the plate 86 and having a downwardly projecting finger 93 freely insertable in a slot 94 in a bracket 95 that is secured to the rear wall of the housing.

The complemental members 88 and 89 preferably are so related that the baffle plate cannot be vertically removed, but they permit the plate to be slid edgewise along the guiding channel after the fingers 93 have been lifted out of their cooperating slots. This sliding movement is utilized for insertion and removal of the plate, and for shifting the latter sufficiently to permit replacement of those filter units, which are located closely adjacent the baffle, without removal of any of the other units.

The space behind the lower series of filter units and below the baffle structure, gives sufficient working room. A special walk 96 for supporting the workman, is provided at the bottom of this space. The walk is made of a coarse and heavy screen mesh so as not to interfere with circulation and dust collection, and has its edges securely clamped against the framework by a pair of angle members 97.

It should be observed that there are no relatively movable working parts on the dust-laden air side of the partition P. It will be appreciated that the general structural and arrangement scheme and the specific individual features above described may be considerably altered within the scope of this invention. For instance, the wafer-like filter units might be horizontally instead of vertically disposed, with their rear ends supported; or they might merely be freely suspended from a horizontal partition. The disclosed embodiment however has such advantages as to be preferred.

The clean air space, between the front wall 22 and the partition P, need be hardly larger than that required to accommodate the beater actuating mechanism M, and the front wall might then be made detachable; but preferably this space is widened somewhat to permit a person to enter and work freely therein. This degree of widening has the further advantage of assuring a sufficiently low and uniform rate of air flow through the filter units as not to produce excessive resistance in any of the latter. The mechanism M and its operating means O will now be described.

The power source O is external of the housing and comprises a horizontal motor 98 (Figures 1, 2, and 16) secured to the floor of the housing and having oppositely directed drive shaft ends 99; a pair of hubs 100 secured to the respective shaft ends and having pairs of peripheral cams 102 each forming a curved guiding groove 103; and a pair of arms 104, one extending toward each hub and each having a pivoted roller 105 designed to fit and follow one of the grooves 103. The rollers, and the arm ends to which they are rotatably connected, are thus caused to oscillate to and fro substantially axially of the motor shaft in response to rotation of the latter, and this rocking movement is utilized to oscillate a pair of vertical shafts 106 to which the arms are keyed. The shafts 106 form parts of two identical sets of beater actuating mechanisms about to be described, and accordingly the cam formations of the hubs 100 preferably are made oppositely or in reversed relationship so that the resistances of the two sets of actuating mechanisms will neutralize each other and help to balance the torques at the opposed motor shaft ends 99.

The vertical shafts 106 (see Figures 1 and 2) are disposed within the clean air chamber, near the partition P and adjacent a vertical longitudinal plane taken centrally through the apparatus. The distance between the shafts is governed primarily by the size of the driving motor 98 and its end shafts 99. Each vertical shaft is journalled in an upper bearing 107 and a lower bearing 108, at least one of which must be designed to take axial thrust. Each shaft is designed to transmit power to the beating elements B of one series of the filter units, although it is apparent that a single shaft could be made to suffice under altered conditions. Each shaft has keyed or locked thereon several spaced collars 109, one for taking care of the beaters of each horizontal row of filter units carried by an individual partition section 33. The intermediate means for transmitting the collar oscillations to the beater shafts 67, comprises the following parts (see Figures 1, 2, and especially Figures 12-14).

Arranged in vertically spaced relation adjacent the shafts 106 are a series of channel bars 110, each of which opens downwardly and is disposed directly in front of a horizontal row of the beater shafts 67. One end of each bar is slidably supported for reciprocation along an arm 112 formed on a bracket 113 that is secured to the frame member 32. The opposite end of each bar is freely supported on the upper reduced end 114 of a vertical pin 115. There is one of these pins 115 formed integral with each collar 109. The main body of each pin 115 is confined between a pair of flanges 116 (Figure 13) that are mounted transversely of the channel of one of the bars 110 and secured thereto so that, upon oscillation of the pin by the collar, the bar 110 will be given a slight reciprocation corresponding with the speed of the motor end shafts.

Each channel bar 110 has several U-shaped clips 117 welded or otherwise suitably secured along their edges in such manner that each forms a rigid part of the bar and presents an opening for the reception of a crank 118 formed on the driven end of one of the beater shafts 67. Each rack bar as it is reciprocated will thus, through the clips 117, oscillate a row of cranks 118 and cause the beaters B to strike and vibrate the filter units.

The apparatus just described can be very quickly assembled and taken apart. With the vertical shafts in position and their collars properly disposed, the channel bars 10 can be conveniently added, without tools, by merely placing the clips 117 over the ends of the cranks 118 while almost simultaneously dropping the bars downwardly upon the pin ends 114 and the arms 112.

All of this movable mechanism, including the beaters B, is disposed in a clean or filtered atmosphere, thus reducing friction and abrasion and eliminating fire hazards. The fire or explosive hazard is still further reduced by a construction in which all metal parts are grounded. The entire apparatus is made of metal with the exception, of course, of the filter cloth which preferably is of non-metallic fabrication.

The operation of the assembled apparatus has been outlined progressively with the descriptions of the major parts, and no further explanation or summary should be necessary.

The described apparatus preferably will have its capacity varied in a vertical direction through the addition of further partition sections 33 with filter units assembled thereon. In such event it will only be necessary to add a further channel bar 110 for operating the beaters of each partition section, as the power source and associated parts is capable of handling further bars within certain limits. Upon adding one or more sections, longer shafts 106 may be substituted but preferably the disclosed shafts are adapted to detachably receive added short sections.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In sub-combination in a filter unit, a foundation member comprising a sheet of screen-like metallic material forming adjacent a pair of its edges, a pair of complemental overlapt and inwardly turned strips, and means for securing said strips in complemental engagement, said foundation member providing a pair of spaced walls one of which includes said overlapt strips, whereby said strips and said securing means are disposed between said walls and function to strengthen the latter against collapse.

2. In a dust filtering unit, a foundation member, a pair of end caps fitted to and spaced apart by said member, a filter cloth complemental to said foundation member, a pair of spaced bearings provided by said end caps, and a shaking device journalled in said bearings.

3. In combination, in a dust filtering apparatus having several sets of filter units and means associated therewith to remove any accumulated dust from said units, a pair of axially aligned rotatable members having oppositely formed cam devices, a common driving means for said rotatable members, and mechanism operable by said cam devices, in response to rotation of said members, to actuate said dust removing means.

4. In combination, in a dust filtering apparatus having a horizontal row of filter units and a plurality of dust removing devices associated with said units, a driven vertical shaft, a horizontal bar arranged to reciprocate adjacent said horizontal row of filter units, means for actuating said bar in response to rotation of said shaft, and means connecting all of said dust removing devices with said reciprocating bar, said actuating means for said bar being maintained in cooperative relationship with said shaft by the weight of said bar.

5. In the combination defined in claim 4, said actuating means being secured to said vertical shaft and embodying a vertical eccentric pin, and said bar having a receptacle portion freely and detachably receiving said pin.

6. In combination, in a dust filtering apparatus, several parallel rows of filter units having beating devices individual thereto, several sets of beater shafts connected to said beating devices and having their operable ends disposed in parallel rows, a reciprocating bar individual to each row of said shaft ends and having a plurality of receptacles for detachable connection with said shaft ends, an oscillatory shaft common to the several bars and arranged at an angle thereto, and several collars secured to said shaft and drivingly connected with said bars to reciprocate the latter.

7. In a filtering apparatus, a substantially vertically disposed filter unit support, a plurality of parallel, substantially horizontally disposed filter units secured to said support and extending substantially longitudinally away therefrom, said units having elements rigidly connected thereto and projecting from the free ends thereof, and a plurality of rigid members interconnecting said elements to thereby restrain the free ends of said units against relative movement toward and away from each other about their secured ends as axes, said rigid members being elongated and being so formed at each end thereof as to detachably fit over the said elements of two adjacent filter units, said members being supported solely by said elements.

8. In a filtering apparatus, in sub-combination an elongated hollow filter unit having a flexible porous wall, and means for directly beating the inner surfaces of said wall, comprising a member journaled within said filter unit and rotatable about an axis substantially parallel to the longitudinal axis of said unit.

9. The apparatus described in claim 8, wherein said filter unit defines a pair of spaced walls and said means is operable externally to beat both of said walls.

10. In a filtering apparatus, an elongated filter unit secured at one end to a support and having at least one flexible porous wall, and beating means mounted adjacent at least one wall of said filter unit, said beating means being operable to exert active forces upon said flexible wall and operable to exert reactive forces at least against the end of said unit that is remote from said support when it is actuated.

11. The apparatus described in claim 10, wherein said filter unit defines a chamber and said beating means is disposed within said chamber.

12. In a filtering apparatus, in sub-combination, a hollow filter unit having an end thereof closed by filtering material, means for journalling one end of a beating mechanism within said unit comprising an apertured member secured to the inner surface of the said closed end of said filter unit, the apertured portion of said member being spaced inwardly of said filtering material.

13. In a filtering apparatus, a plurality of filter units disposed in a substantially horizontal row, a plurality of crank-ended beater elements corresponding in number to, and operable to apply beating efforts to said filter units, said beater elements having their cranked ends disposed in a substantially horizontal row, a horizontally disposed, reciprocable actuating member, means mounting said member for reciprocating movement, means for reciprocating said member, and means for establishing a driving connection between said member and the cranked end of each of said beater elements.

14. The apparatus described in claim 13, wherein said reciprocating means is operable to support said actuating member for reciprocating movement.

15. In a filtering apparatus, in sub-combination, a plurality of crank-ended beater elements mounted for rocking movement and having their cranked-ends disposed in a substantially horizontal line, a horizontally disposed actuating member disposed adjacent the cranked ends of said beater elements, means for reciprocating said member, comprising a vertically extending crank pin disposed in a recess provided on said member, said member having a plurality of recesses provided thereon corresponding in number to end facing and embracing the cranked ends of said beater elements, said last-named recesses having open bottoms, whereby said member may be readily lifted free from said beater elements and said crank pin.

16. In a filtering apparatus, a partition member having an aperture therein, a hollow filter unit having an open end through which a filterable medium is adapted to pass, said filter unit having an inwardly extending boss provided therein adjacent its open end, and means for securing said filter unit against one side of said partition member with the open end thereof in registry with said aperture, comprising an element extending through the open end of said filter unit and engaging behind said boss, said elements being of a generally T-shaped configuration and whose arms are adapted to bridge the open end of said filter unit and engage said boss.

17. In a filtering apparatus, in combination with a wall having a port, a hollow filter unit comprising a relatively rigid ring shaped to cooperate with a wall adjacent said port, a filter cloth having a sleeve-like body, one of which is designed to be received between said ring and said wall, and means, disposed within said filter unit, for forcing said ring toward said wall, and retaining it in position adjacent the latter in substantial alignment with said port, said ring being in the form of a band having a peripheral reduced portion, said one end of the cloth body being overlapt on said reduced portion, and there being a detachable retainer snugly surrounding said overlapt end and said reduced portion to hold the former against the latter.

18. In a filtering apparatus, a filter unit supporting member, an elongated, hollow filter unit disposed substantially horizontally and secured to said support and extending away therefrom, said filter unit comprising a sheet of flexible material bent upon itself to define a chamber, and a horizontally disposed member mounted within said filter unit and operable to restrain the latter against flexing downwardly under the influence of gravity, said member being operable to secure the meeting edges of said flexible sheet together.

19. In a filtering apparatus having a receiving chamber and an inlet for said chamber, a set of detachable filter units mounted in said chamber, certain of said filter units being located opposite said inlet, a distributing member disposed adjacent said inlet and closely adjacent said certain filter units, and means for mounting said distributing member for sliding movement from interdisposition between said certain filter units and said inlet, whereby said certain units may be conveniently serviced and replaced.

20. In a dust filtering mechanism, a flexible filter cloth forming an expansive layer of filtering material and defining an open ended bag having at least two substantially flat sides of siderable area; a light flexible screen-like structure enveloped by said flexible cloth and being substantially coextensive with the flat sides thereof for preventing said bag from collapsing when air is drawn from the outer to the inside thereof, said screen-like structure being capable of undergoing extensive vibration when shaken or struck by a moving object; and a beating device extending through the open end of said unit and operable to apply dust dislodging blows directly against said screen-like structure.

21. In a dust filtering apparatus, in sub-combination, an elongated filter unit of oblong transverse section and having an open end, said unit having an inwardly extending boss adjacent its open end, a support having an oblong opening therein, means for securing said filter unit to said support with the open end of the former in registry with the opening in the latter, comprising a clamping member extending through the open end of said filter unit and having a laterally extending head thereon whose minor axis is less than the width of the opening in said filter unit and whose major axis is greater than the width of the opening in said filter unit, and means for holding said head in tight engagement with said boss after it has been manipulated to bring its major axis crosswise of said unit.

22. The dust filtering apparatus described in claim 21, wherein said last named means comprises a member having arms bridging the opening in said wall.

23. In a filtering apparatus, a flexible porous member defining a single independent chamber having a pair of spaced flat walls, said walls being substantially parallel and adapted to flex in response to an internal beating or like mechanism, a filtering element completely enveloping said member and adapted to contact said walls, means for causing said walls to undergo synchronous flexing movements when a beating action is applied to the inner surface of one of them, and means located within said chamber for directly beating at least one of said walls.

24. In a filtering apparatus, a partition member having an aperture therein, a hollow filter unit having an open end through which a filtrable medium is adapted to pass, means for securing said filter unit to said partition member with the open end thereof in registry with said aperture, a rotatable beating device disposed within said unit and extending through the aperture in said partition, said beating device being journaled for rocking movement in the end of said unit remote from said partition member, and actuating means connected to said beating device exteriorly of said filter unit.

WILLIAM A. ROSENBERGER.